Patent Number: 4,512,887
… Date of Patent: Apr. 23, 1985

[54] CHLORINE INJECTOR FOR TREATMENT OF EFFLUENT

[76] Inventors: Harold A. Ritke; Randal G. Ritke, both of 1932 S. Kingsway Dr., Aurora, Ill. 60506

[21] Appl. No.: 443,761

[22] Filed: Nov. 22, 1982

[51] Int. Cl.³ ............................................. C02F 1/76
[52] U.S. Cl. ..................................... 210/220; 137/137
[58] Field of Search ............... 210/169, 754, 753, 220, 210/221.2; 261/DIG. 75, 121 R, 121 M, 121 A, 121 B; 417/90, 87, 86, 76, 108, 160; 137/137, , 838

[56] References Cited

U.S. PATENT DOCUMENTS

| | | | |
|---|---|---|---|
| 1,845,675 | 2/1932 | Martin | 417/87 |
| 2,716,509 | 8/1955 | Saul | 417/108 |
| 3,304,564 | 2/1967 | Green et al. | 210/169 |
| 4,333,833 | 6/1982 | Longley et al. | 210/754 |

*Primary Examiner*—Richard V. Fisher
*Assistant Examiner*—Sharon T. Cohen
*Attorney, Agent, or Firm*—Ernest Kettelson

[57] ABSTRACT

A chlorine injector for treatment of effluent includes apparatus which provides two separate vacuum forces that supplement each other to create sufficient vacuum force to draw chlorine from a chlorine tank and inject it into a sewage effluent tank for treatment of the effluent therein. The apparatus includes a water chamber positioned above the surface of the effluent, an airlift tube extending from the water chamber having its intake end submerged in the effluent and its discharge end inside of the water chamber at the upper portion thereof, an overflow return pipe extending from the water chamber to return excess effluent to the tank, and the chlorine injection assembly having the double vacuum means comprising a first eductor nozzle leading from the bottom of the water chamber to discharge into a second induction nozzle having a flared intake end, creating a first vacuum at this point by the venturi effect. Chlorine is introduced at this point by an inlet port opening in the side wall of the flared end region of the second nozzle, a chlorine supply hose being connected to the inlet port and leading to the chlorine supply tank. The second nozzle is connected to an injection tube which provides the second vacuum by virtue of a "hanging column of water" achieved by positioning the second nozzle an appropriate distance above the surface of the effluent, such as 40 inches or more.

7 Claims, 4 Drawing Figures

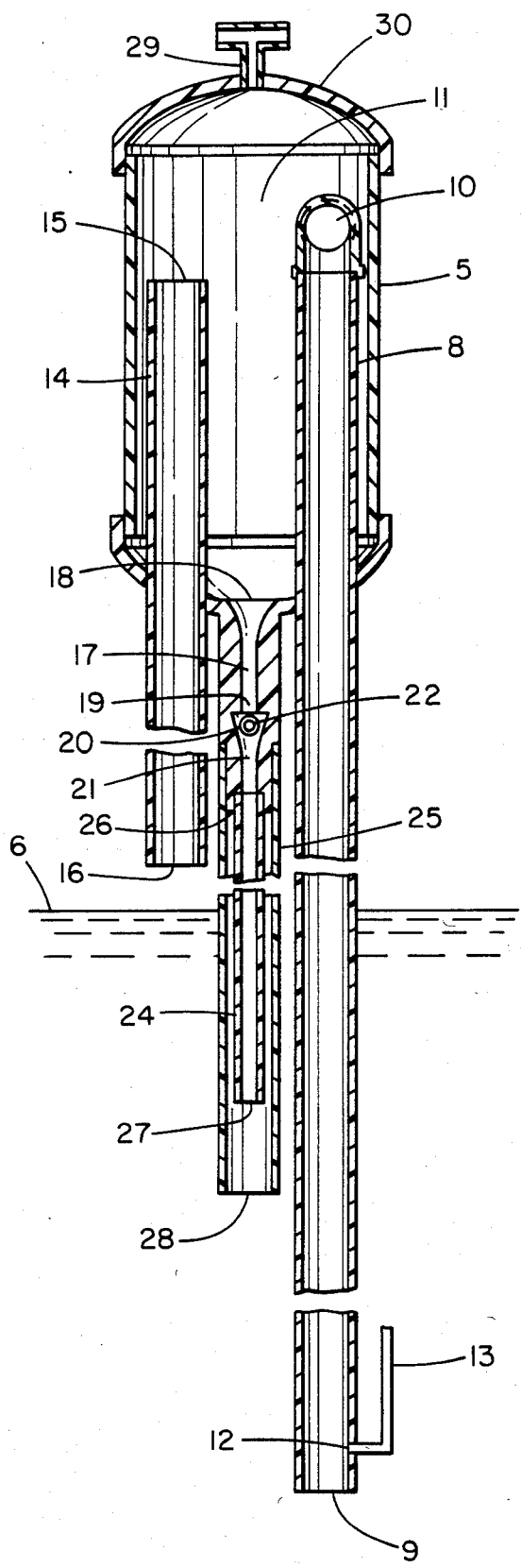
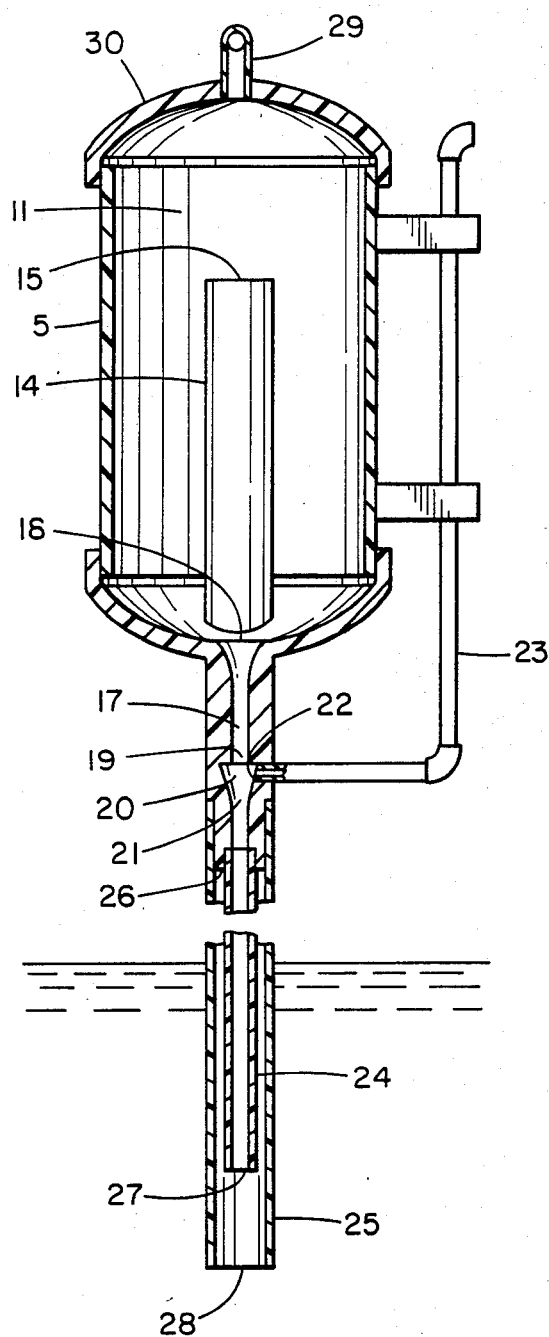
FIG. 3
FIG. 4

CHLORINE INJECTOR FOR TREATMENT OF EFFLUENT

BACKGROUND OF THE INVENTION

This invention relates to the field of chlorine injecting devices and apparatus which introduce chlorine into waste water or sewage effluent for treatment.

A major problem for apparatus of this kind is that the pumps, screens and conduits of prior art devices would become clogged with particulate matter if the effluent water was itself used as the flow medium. Other prior art devices attempted to avoid this problem by using clean water or treated potable water, but as much as 10,000 to 15,000 gallons of water per day are needed which makes it expensive to use already treated or cleaned water all of which goes to waste when it is used as the flow medium ending up in the effluent or waste water. Prior art devices also use pumps to lift the water used as the flow medium into the water chamber, but they have a short life span when operating 24 hours a day. Pump maintenance and replacement costs become excessive.

Examples of prior art devices in this field of waste water treatment and water purefying devices are disclosed in the following U.S. Pat. No. 4,250,144; No. 4,247,531; No. 4,163,712; No. 3,531,406; No. 3,304,564; No. 2,999,797; No. 2,957,474; No. 2,362,607; No. 2,064,627; No. 1,085,348 and No. 897,940.

The present invention overcomes a number of the problems which exist with prior art devices, since it uses an airlift tube and pressurized air supply rather than a pump in the water passageway of the device itself to lift water into the water chamber. The pressurized air supply of course utilizes a pump in the mechanism used to build up air pressure in a tank from which pressurized air may be obtained for various purposes as is well known in the prior art, and which is not part of the invention shown or described herein. The invention also provides a continuous flow passageway through the entire assembly which is large enough in diameter to permit the passage of particulate matter which may be in the effluent, thereby making screens unnecessary and permitting the use of the effluent water itself as the flow medium rather than requiring a separate cleaned or treated water supply. The particular construction of this invention provides two separate vacuum forces working together to supplement the total vacuum created which is sufficient to draw chlorine from its supply tank, then induce it or mix it with the effluent carrier fluid, after which the chlorinated effluent is injected into the body or tank of effluent water that is to be treated.

SUMMARY OF THE INVENTION

It is an object of the invention to provide a chlorine injector for treatment of sewage which does not require a pump in the water passageway.

It is an object of the invention to provide a chlorine injector for treatment of sewage which can use the effluent water itself as the carrier fluid.

It is an object of the invention to provide a chlorine injector for treatment of sewage which has a clog-free through passageway for the carrier fluid and chlorine when mixed therewith.

It is an object of the invention to provide a chlorine injector for treatment of sewage which creates two separate vacuums which supplement each other to provide a total vacuum sufficient to draw chlorine from its supply tank and induce it into the carrier fluid for mixing prior to being injected into the effluent to be treated.

It is an object of the invention to provide a chlorine injector for treatment of sewage which creates two separate vacuums to supplement each other, comprising one vacuum created by a venturi effect and a second vacuum created by the principle of a hanging column of water extending from a point above the surface of the effluent to be treated to a point below the surface thereof.

BRIEF DESCRIPTION OF THE DRAWING

FIG. 3 is a section view taken on line 3—3 of FIG. 2.

FIG. 4 is a section view taken on line 4—4 of FIG. 2.

DESCRIPTION OF PREFERRED EMBODIMENT

Figure 1:
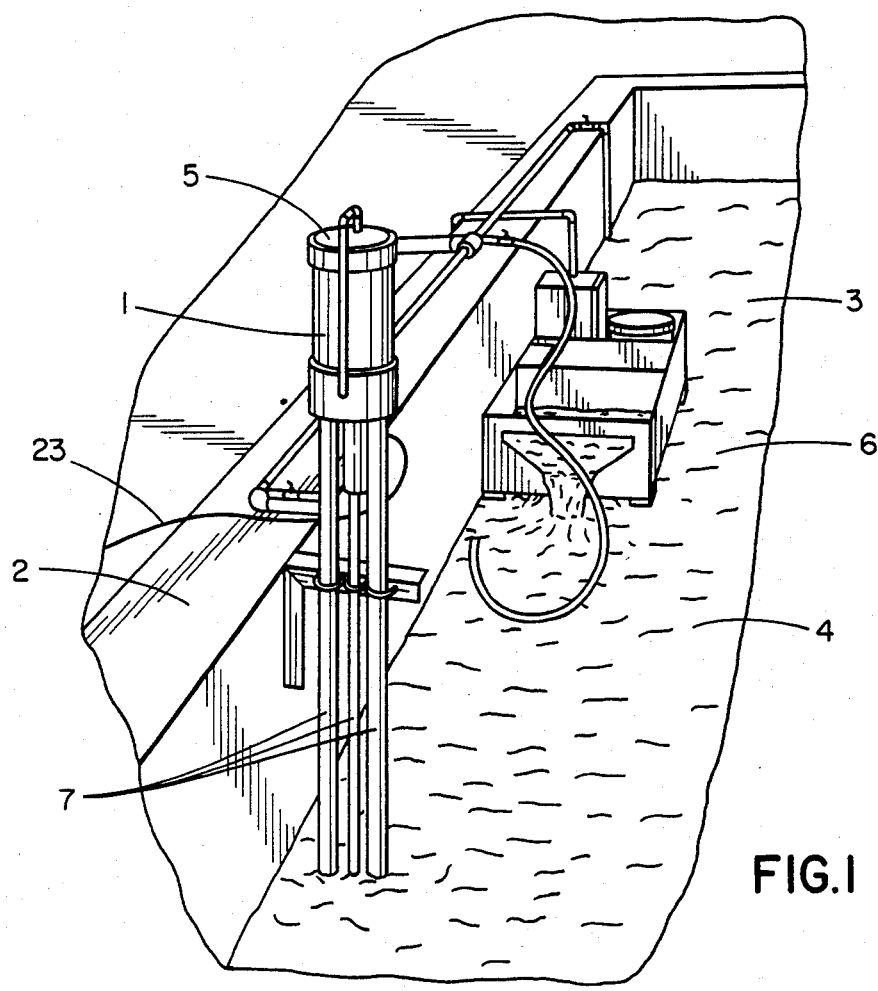
FIG. 1 is a perspective view of a chlorine injector for treatment of sewage in accordance with this invention shown in position for treating a body of effluent waste water.
Figure 2:
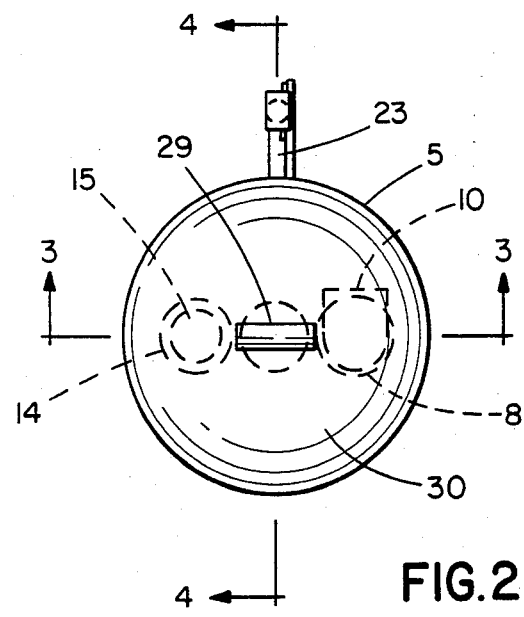
FIG. 2 is a top plan view of the chlorine injector in accordance with this invention.

A chlorine injector 1 for treatment of sewage in accordance with this invention is mounted for operation to the side wall 2 of a sewage treatment tank 3 having effluent 4 therein to be treated.

The chlorine injector 1 includes a water chamber 5 positioned above the surface 6 of the effluent 4, and three tubular members or conduits 7 leading from the water chamber 5 down to the body of the effluent water 4.

One of the tubular members 7 is an airlift tube 8, havings its intake end 9 below the surface 6 of the effluent 4, and its discharge end 10 extending into the interior 11 of the water chamber 5 near the upper portion thereof. An air supply port 12 opens through the side wall of the airlift tube 8 near its intake end 9, and an air supply conduit 13 extends from the port 12 to a source of pressurized air. Such pressurized air injected through the port 12 into the airlift tube 8 and upwardly to the discharge end 10 cause effluent water 4 to flow from the tank 3 upwardly into the water chamber 5.

A second one of the tubular members 7 is an overflow or return pipe 14, for return of surplus effluent water 4 to the tank 3. The return pipe 14 includes an inlet end 15 inside of the water chamber 5 located at a level below that of the discharge end 10 of the airlift tube 8. Thus, when the level of the effluent water 4 in the water chamber 5 reaches the level of the inlet end 15 of the return pipe 14, the excess effluent water flows through the return pipe 14 back to the effluent tank 3 through the discharge end 16 of the return pipe 14 which is above the surface 6 of the effluent 4.

The third one of the tubular members 7 is the chlorine injection assembly, comprising a first eductor nozzle 17 opening at its upper end 18 to the bottom of the water chamber 5. The lower end 19 of the eductor nozzle 17 opens to the flared end 20 of a second nozzle 21, which may be called an induction nozzle or venturi nozzle. A chlorine discharge port 22 opens through the side wall of the induction nozzle 21 at its flared end region 20 for entry of chlorine into the apparatus in a manner subsequently described herein. A chlorine supply hose or tubing 23 is connected between the chlorine discharge port 22 and a chlorine supply tank (not shown). Effluent water flowing through the first and second nozzles 17 and 21 creates a first vacuum as explained below to draw chlorine from its supply tank into the device.

The chlorine injection assembly further comprises an injection tube 24, coaxially mounted within a larger diameter dispersion tube 25, both extending downward into the effluent 4 and having their respective discharge openings below the surface 6 of the effluent water 4.

The injection tube 24 is connected at its upper end 26 as an integral extension downwardly of the second or induction nozzle 21, and it extends downwardly into the effluent 4 terminating at its discharge opening 27 which is below the surface 6 of the effluent water 4. The upper end 26 of the injection tube 24 is above the surface 6 of the effluent, and during operation of the chlorine injector a continuous column of water is always present in the injection tube 24 from its upper end 26 above the effluent surface 6 to its discharge end 27 below the surface 6. This continuous column of water flowing from above the effluent surface 6 to below the effluent surface 6 provides a second vacuum force, as explained in more detail below, to coact with the first vacuum force. The combined force of the two vacuums is sufficient to draw chlorine from its supply tank into the induction nozzle or venturi nozzle 21 at its flared end region 20, and to mix the chlorine with the effluent water 4 as it flows from the water chamber 5 through the first and second nozzles 17 and 21, into the injection tube 24 for discharge into the effluent 4 in the tank 3 for treatment.

The diameter of the orifice of the induction or venturi nozzle 21 must be in a predetermined ratio to the diameter of the injection tube 24 in order for a continuous column of water to be present throughout the length of the injection tube 24 during operation. Various combinations of diameters may be used, the diameter of the injection tube 24 being slightly larger than the diameter of the orifice of the induction or venturi nozzle 21. A preferable combination of sizes is a ¾ inch diameter of the injection tube 24 and a ½ inch diameter of the orifice of the induction or venturi nozzle 21, both diameter sizes being sufficiently large to enable particulate matter which may be in the effluent water 4 to freely pass without clogging.

The discharge opening 28 of the larger diameter coaxial dispersion tube 25 is positioned below the discharge opening 27 of the injection tube 24, both being below the surface 6 of the effluent 4 in the tank 3.

A vent 29 is provided in the top 30 of the water chamber 5 to relieve pressure build up within the chamber.

In operation, a source of pressurized air (comprising a pressure tank and air pump, not shown) is fed through the air supply port 12 into the airlift tube 8 which has its intake 9 below the surface 6 of the effluent 4 in the tank 3. This causes a flow of effluent water 4 to flow upwardly through the tube 8 and its discharge end 10 into the interior 11 of the water chamber 5. The flow of effluent water 4 into the chamber 5 is greater than the flow outward through the chlorine injection assembly of nozzles and tubes, so the chamber 5 will gradually fill. Any surplus effluent water 4 enters the intake opening 15 of the return pipe 14 for discharge back into the effluent tank 3.

As the water chamber 5 fills, effluent water 4 flows into the upper end 18 of the first nozzle or eductor nozzle 17, through the opening at its lower end 19 into the flared end 20 of the second nozzle 21, or the induction or venturi nozzle, and continuing downwardly into and through the injection tube 24 for eventual discharge at the submerged discharge opening 27 of the tube 24. The effluent water 4 flowing into the injection tube 24 flows at a slightly faster rate than the effluent water 4 flowing out its submerged discharge opening 27 because of the back pressure of the body of effluent water 4 in the tank 3, until the tube 24 fills, at which time the pressure of the water within the length of the tube 24 begins to equal and exceed the back pressure of the body of effluent water 4 in the tank 3. A faster rate of flow through the tube 24 then begins until the outward flow through discharge opening 27 into the body of effluent 4 in tank 3 is equalized with the inward flow from the venturi nozzle 21 into the upper end 26 of the tube 24. Thus, what is sometimes called a "hanging column of water," or a continuous column of water is present within the tube 24 while the chlorine injection device in accordance with this invention is operating, and such "hanging" or continuous column of water creates a vacuum effect.

A first vacuum effect is created just upstream from the continuous column of water vacuum by virtue of the venturi nozzle 21, and the discharge into its flared end 20 of the effluent water 4 as it flows downwardly from the water chamber 5. By being positioned immediately downstream from the venturi vacuum, the continuous column of water vacuum enhances, adds to and supplements the strength or force of the venturi vacuum. The total force of the two vacuums combined is sufficient to draw chlorine into the venturi nozzle 21 through the chlorine port 22, and to thereupon mix the chlorine with the effluent water flow medium as it passes on downwardly through the injection tube 24 for eventual discharge into the body of effluent 4 in the tank 3 which is to be treated.

That portion of the dispersion tube 25 which extends below the discharge opening 27 of the injection tube 24 serves to maintain more or less equalized back pressure of the body of effluent 4 at the discharge opening 27 of tube 24 and protect it from fluctuations in pressure which might otherwise occur due to external disturbances on the body of effluent 4. Fluctuations in back pressure at the discharge opening 27 may cause the tube 24 to lose part or all of its "hanging" or continuous column of water thereby imparing its vacuum effect. By having the coaxial dispersion tube 25 extend below the discharge opening 27 of tube 24, this possibility is minimized or avoided all together.

Once operation is begun, it can be maintained continuously as long as a supply of pressurized air is fed into the airlift tube 8. There are no screens to unclog, no separate supply of water to provide as the flow medium.

The upper end 26 of the injection tube 24 should be at an appropriate distance above the surface 6 of the body of effluent water 4 in order to provide the "hanging" or continuous column of water which creates the second vacuum. This distance may, for example, be 40 inches from the upper end 26 of injection tube 24 down to the surface 6 of the body of effluent water 4, when the diameter of the injection tube is three-fourths of an inch as described above in the example given. The total weight of a column of water extending from the upper end 26 of the injection tube 24 having a ¾ inch diameter and spaced 40 inches above the surface 6 of the body of effluent water 4 is sufficient to equalize the back pressure of the body of effluent water 4. In this way, the amount of effluent water 4 flowing into the upper end 26 is substantially equal to the amount of water flowing out of the discharge end 27 of the injection tube 24, thereby maintaining the "hanging" or continuous column of water while the chlorine injector in accordance with this invention is in operation.

It will be obvious that various modifications in structure, dimensions, materials and the like may be made without departing from the scope of this invention.

We claim:

1. An injector of a water treating substance for treatment of water, comprising means defining a fluid passageway in communication with said water to be treated, first vacuum means to create a first vacuum in said passageway, second vacuum means to create a second vacuum in said passageway adjacent to and downstream from said first vacuum to add to and supplement the force of said first vacuum to provide a total vacuum force greater than either of said first and second vacuum means can provide acting separately, means defining a port opening to said passageway to introduce a water treating substance therein when said first and second vacuums are created, wherein said first vacuum means includes a venturi tubular member in said passageway, said venturi tubular member including a first nozzle, said first nozzle including an upstream end and a downstream end, a second nozzle positioned downstream of said first nozzle, said second nozzle including a flared end portion in registration with said downstream end of said first nozzle to create said first vacuum when fluid is flowed through said passageway, into and through said first and second nozzles of said venturi tubular member and the said flared end portion of said nozzles, wherein said second vacuum means includes an elongated tubular member in said passageway, said tubular member including an upstream end and a downstream end, means defining an inlet port opening to said upstream end of said elongated tubular member positioned above the surface of said water to be treated, means defining a discharge port opening to said downstream end of said elongated tubular member positioned below the surface of said water to be treated, said water to be treated providing back pressure at the said discharge port, and flow means to flow a fluid into said tubular member at a rate to fill such tubular member until the pressure within said tubular member begins to exceed said back pressure resulting in more rapid discharge into said water to be treated and in creation of said second vacuum, said fluid filling said tubular member constituting a column of fluid extending from said inlet port to said discharge port of said tubular member, said column of fluid as it moves from said inlet port toward said discharge port causing a vacuum to form between said inlet port and said column of fluid as it moves toward said discharge port and said column of fluid as it moves toward said discharge port thereby creating said second vacuum, wherein said fluid passageway includes means defining a water chamber positioned above a body of effluent water to be treated, an effluent water inlet tube extending from said body of effluent water to said water chamber pressurized air means operatively associated with said effluent water inlet tube to flow effluent water upwardly into said water chamber, the bottom portion of said water chamber opening for flow of said effluent water outwardly of said chamber and past said first vacuum means to create said first vacuum, then past said second vacuum means to create said second vacuum, and means for introducing water treatment substance into the passageway wherein said water treating substance introduced into said passageway when said vacuums are created mixes with said effluent water flowing in said passageway for eventual discharge into said body of effluent water to treated.

2. An injector of a water treating substance as set forth in claim 1, wherein said fluid passageway comprises a completely unobstructed bore throughout to avoid clogging.

3. An injector of a water treating substance as set forth in claim 1, including an overflow pipe extending from said water chamber to said body of effluent water to return any surplus effluent water which may build up in said water chamber back to said body of effluent water.

4. An injector of a water treating substance as set forth in claim 1, including a second larger diameter tubular member coaxially surrounding said first mentioned tubular member, said second tubular member extending beyond the discharge port of said first mentioned tubular member and terminating at a discharge port which is spaced apart from and beyond the said discharge port of said first mentioned tubular member.

5. An injector of a water treating substance as set forth in claim 1, wherein said flow means to flow a fluid into said tubular member at said rate includes means defining a bore of said venturi tubular member opening downstream adjacent to said inlet port of said tubular member, said bore of said venturi tubular member having a first diameter, said tubular member having a second diameter, said second diameter being slightly larger than said first diameter.

6. An injector of a water treating substance as set forth in claim 5, wherein said first diameter is about one-half of an inch and said second diameter is about three-fourths of an inch.

7. An injector of a water treating substance as set forth in claim 1, wherein said means for introducing said water treating substance into said passageway when said vacuums are created is a means for introducing chlorine.

* * * * *